US 11,995,934 B2

(12) United States Patent
Hong et al.

(10) Patent No.: US 11,995,934 B2
(45) Date of Patent: May 28, 2024

(54) ELECTRONIC DEVICE FOR CONTROLLING ENTRY OR EXIT BY USING WIRELESS COMMUNICATION, AND METHOD THEREFOR

(71) Applicant: Samsung Electronics Co., Ltd., Suwon-si (KR)

(72) Inventors: Sukgi Hong, Suwon-si (KR); Sehwan Choi, Suwon-si (KR); Hyunchul Kim, Suwon-si (KR); Jungsik Park, Suwon-si (KR); Yi Yang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/751,069

(22) Filed: May 23, 2022

(65) Prior Publication Data

US 2022/0284752 A1    Sep. 8, 2022

Related U.S. Application Data

(63) Continuation of application No. PCT/KR2020/017400, filed on Dec. 1, 2020.

(30) Foreign Application Priority Data

Dec. 18, 2019   (KR) .................... 10-2019-0170088

(51) Int. Cl.
*G07C 9/22* (2020.01)
*G07C 9/00* (2020.01)
(Continued)

(52) U.S. Cl.
CPC ........... *G07C 9/22* (2020.01); *G07C 9/00309* (2013.01); *H04W 4/023* (2013.01); *H04W 4/80* (2018.02);
(Continued)

(58) Field of Classification Search
CPC .................. G07C 9/22; G07C 9/00309; G07C 2009/00769
See application file for complete search history.

(56) References Cited

U.S. PATENT DOCUMENTS

| 10,239,494 B2 | 3/2019 | Spiess |
| 10,620,690 B2 | 4/2020 | Lee et al. |

(Continued)

FOREIGN PATENT DOCUMENTS

| CN | 101089897 A | 12/2007 |
| CN | 103413198 A | 11/2013 |

(Continued)

OTHER PUBLICATIONS

Extended European Search Report dated Nov. 9, 2022, issued in European Patent Application No. 20903135.0.
(Continued)

*Primary Examiner* — Nabil H Syed
(74) *Attorney, Agent, or Firm* — Jefferson IP Law, LLP

(57) ABSTRACT

An electronic device is provided. The electronic device includes a communication circuit for performing first communication and second communication, an entry-exit management circuit for controlling a door locking device, and a processor operatively connected to the communication circuit and the entry-exit management circuit. The processor establishes a connection to an external electronic device by using the first communication, transmit or receive a parameter for the second communication by using the first communication, establish a connection to the external electronic device by using the second communication, measure the distance from the external electronic device by using a first mode of the second communication, identify a key stored in the external electronic device when the measured distance is within a designated distance, activate or deactivate the door locking device by using the entry-exit management circuit
(Continued)

on the basis of the key, and determine whether a first distance from a user of the external electronic device or a second distance from the external device is measured, on the basis of at least one of a state of the external electronic device, the first distance, and the second distance when the door locking device is deactivated, wherein the first distance may be measured using a second mode of the second communication.

9 Claims, 8 Drawing Sheets

(51) Int. Cl.
H04W 4/02 (2018.01)
H04W 4/80 (2018.01)

(52) U.S. Cl.
CPC .............. G07C 2009/00769 (2013.01); G07C 2209/08 (2013.01); G07C 2209/62 (2013.01); G07C 2209/63 (2013.01)

(56) References Cited

U.S. PATENT DOCUMENTS

| 10,843,343 | B2 | 11/2020 | Lee et al. |
| 2007/0105582 | A1 | 5/2007 | McCorkle |
| 2007/0288995 | A1 | 12/2007 | Terada et al. |
| 2008/0218367 | A1* | 9/2008 | Yanagi ............... G08B 13/2454 340/686.1 |
| 2014/0342670 | A1 | 11/2014 | Kang et al. |
| 2016/0248782 | A1* | 8/2016 | Troesch ................ H04L 63/107 |
| 2017/0236351 | A1 | 8/2017 | Menard et al. |
| 2017/0328997 | A1* | 11/2017 | Silverstein ............. G01S 13/86 |
| 2019/0034679 | A1 | 1/2019 | Schadow et al. |
| 2019/0130712 | A1 | 5/2019 | Johnson et al. |
| 2019/0135229 | A1* | 5/2019 | Ledvina ................ H04W 12/06 |
| 2019/0200339 | A1 | 6/2019 | Handte et al. |
| 2022/0157106 | A1* | 5/2022 | Pirch .................. G06K 7/10366 |
| 2022/0327881 | A1* | 10/2022 | Ivarson .................... G07C 9/20 |

FOREIGN PATENT DOCUMENTS

| CN | 105160743 A | 12/2015 |
| CN | 105191172 A | 12/2015 |
| CN | 105593911 A | 5/2016 |
| CN | 108076212 A | 5/2018 |
| CN | 108216121 A | 6/2018 |
| CN | 109114411 A | 1/2019 |
| CN | 109547052 A | 3/2019 |
| KR | 10-2014-0135569 A | 11/2014 |
| KR | 10-2016-0132168 A | 11/2016 |
| KR | 10-1692993 B1 | 1/2017 |
| KR | 10-2017-0100173 A | 9/2017 |
| WO | 2018/046271 A1 | 3/2018 |

OTHER PUBLICATIONS

Chinese Office Action dated Jun. 1, 2023, issued in Chinese Patent Application No. 202080086890.6.
Chinese Notice of Allowance date Jan. 9, 2024, issued in Chinese Patent Application No. 202080086890.6.

* cited by examiner

ELECTRONIC DEVICE FOR CONTROLLING ENTRY OR EXIT BY USING WIRELESS COMMUNICATION, AND METHOD THEREFOR

CROSS-REFERENCE TO RELATED APPLICATION(S)

This application is a continuation application, claiming priority under § 365(c), of an International application No. PCT/KR2020/017400, filed on Dec. 1, 2020, which is based on and claims the benefit of a of Korean patent application number 10-2019-0170088, filed on Dec. 18, 2019, in the Korean Intellectual Property Office, the disclosure of which is incorporated by reference herein in its entirety.

BACKGROUND

1. Field

The disclosure relates to an electronic device for controlling entry or exit by using wireless communication, and a method therefor.

2. Description of Related Art

Recently, with the development of electronic devices, convergence and complex research and product development in various industrial fields are being conducted. For example, one of the research and development may include an access system. In the case of an access system, an electronic device may be used to replace a physical key. An electronic device may communicate with an external electronic device and may also be capable of positioning indoors.

Socially, shared accommodations or shared offices are gradually increasing, and if users share a physical key or a password for a door, there is a risk of loss or duplication of the physical key or exposure of the password.

An access system using an electronic device is expected to be able to solve this problem.

The above information is presented as background information only to assist with an understanding of the disclosure. No determination has been made, and no assertion is made, as to whether any of the above might be applicable as prior art with regard to the disclosure.

SUMMARY

Technical Problem

An administrator may temporarily authorize a designated user to access a designated area. For example, an administrator may temporarily authorize a designated user to enter a house. However, the designated user may break into an unauthorized area, which may cause privacy issues or cause theft of or damage to items in the house. In order to solve this, closed circuit television (CCTVs) may be used, but separate installation is required, which may be inefficient in terms of cost and power consumption.

Aspects of the disclosure are to address at least the above-mentioned problems and/or disadvantages and to provide at least the advantages described below. Accordingly, an aspect of the disclosure is to provide an electronic device which reduces cost or power consumption while preventing a user, whose access has been temporarily authorized, from entering an unauthorized area, by accurately positioning the user.

Additional aspects will be set forth in part in the description which follows and, in part, will be apparent from the description, or may be learned by practice of the presented embodiments.

Solution to Problem

In accordance with an aspect of the disclosure, an electronic device is provided. The electronic device includes a communication circuit configured to perform first communication and second communication, an access management circuit configured to control a door locking device, and a processor operatively connected to the communication circuit and the access management circuit, wherein the processor is configured to establish a connection to an external electronic device by using the first communication, transmit or receive a parameter for the second communication by using the first communication, establish a connection to the external electronic device by using the second communication, measure a distance from the external electronic device by using a first mode of the second communication, identify a key stored in the external electronic device if the measured distance is within a designated distance, activate or deactivate, based on the key, the door locking device by using the access management circuit, and determine, when the door locking device is deactivated, whether a first distance from a user of the external electronic device or a second distance from the external device is measured, based on at least one of a state of the external electronic device, the first distance, or the second distance, and the first distance is measured using a second mode of the second communication.

In accordance with another aspect of the disclosure, an operation method of an electronic device is provided. The operation method includes establishing a connection to an external electronic device by using first communication, transmitting or receiving a parameter for second communication by using the first communication, establishing a connection to the external electronic device by using the second communication, measuring a distance from the external electronic device by using a first mode of the second communication, identifying a key stored in the external electronic device if the measured distance is within a designated distance, activating or deactivating, based on the key, a door locking device, and determining, when the door locking device is deactivated, whether a first distance from a user of the external electronic device or a second distance from the external device is measured, based on at least one of a state of the external electronic device, the first distance, or the second distance, wherein the first distance is measured using a second mode of the second communication.

Advantageous Effects of Invention

In an electronic control device and a method of the electronic control device according to various embodiments of the disclosure, a service corresponding to a user may be provided by identifying a key stored in an electronic device of the user and positioning the user and the electronic device of the user.

In the electronic control device and the method of the electronic control device according to various embodiments of the disclosure, an area that the user is able to enter/exit or access may be limited according to the key stored in the electronic device of the user.

In the electronic control device and the method of the electronic control device according to various embodiments of the disclosure, if the user enters an area that the user cannot enter/exit or access, a person with authority, for example, an administrator, may be notified, thereby increasing security.

In the electronic control device and the method of the electronic control device according to various embodiments of the disclosure, a door for access to a designated area may be controlled by a person with authority with respect to the designated area.

In the electronic control device and the method of the electronic control device according to various embodiments of the disclosure, power consumption may be reduced by measuring a distance from the user for a specified time.

In the electronic control device and the method of the electronic control device according to various embodiments of the disclosure, whether the user is inside or outside the designated area can be determined using an ultra-wide band (UWB) signal, and positioning of the user and the electronic device of the user may be possible.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
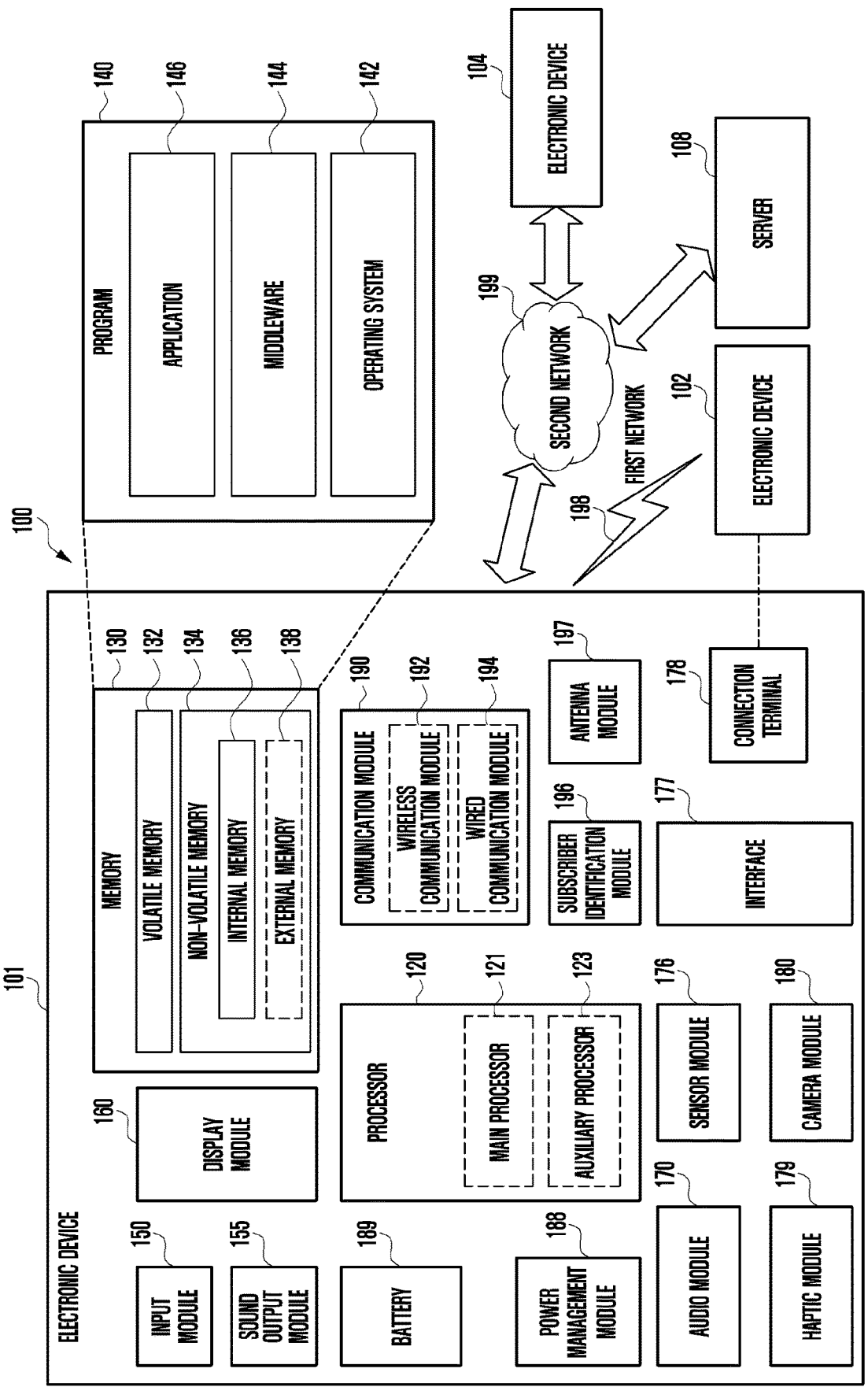
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 2A:
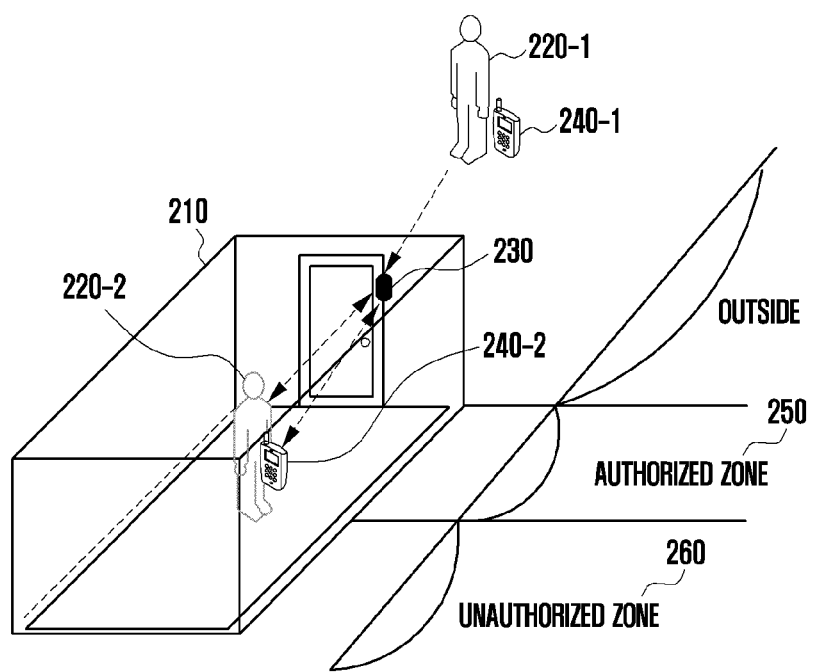
FIGS. 2A and 2B are conceptual diagrams of an access system according to an embodiment of the disclosure.
Figure 2B:
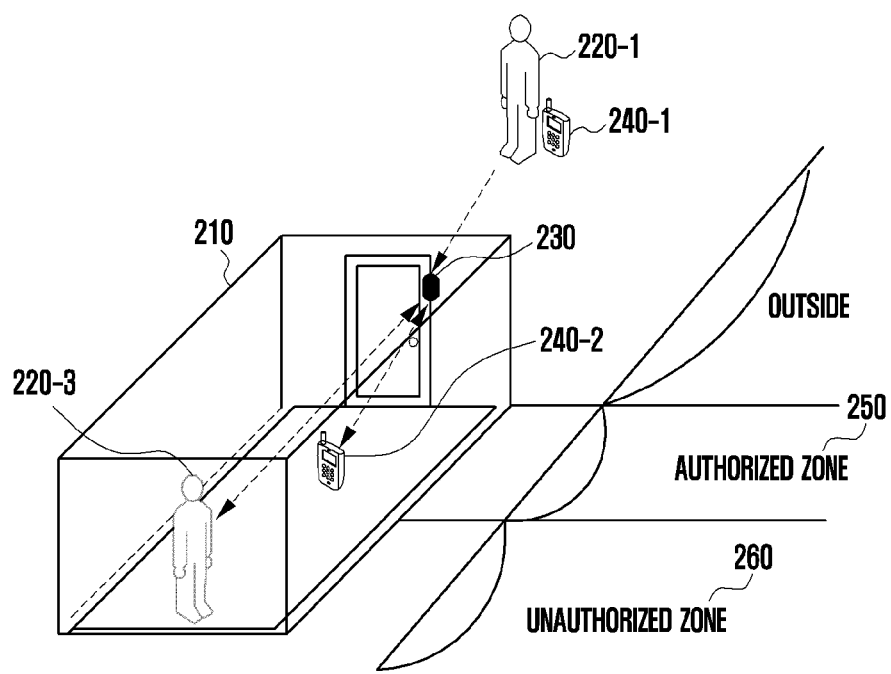

FIGS. 2A and 2B are conceptual diagrams of an access system according to an embodiment of the disclosure.

(Referring to FIGS. 2A and 2B, a specific area 210, and according to the various embodiments of the disclosure is illustrated. The specific area 210 may be an office, a home, a space with an owner, and a space requiring management. The specific area 210 may be divided into an authorized zone 250 and an unauthorized zone 260. For example, the area may be the zone 250 in which only a certain range from a door is authorized. The authorized zone 250 may be configured by a user (e.g., an administrator) with authority.

The access system according to various embodiments of the disclosure may include an electronic control device 230 (e.g., the electronic device 101 of FIG. 1). The electronic control device 230 may be located around or at the door. The electronic control device 230 may measure distances from users 220-1, 220-2, and 220-3 or electronic devices 240-1 and 240-2 of the users, which are carried by the users, and may control opening and closing of the door.

The 220-1 and 220-2 may visit the specific area 210. However, when the users 220-1 and 220-2 visit the specific area 210, there may be no means for controlling the door. The electronic control device 230 according to various embodiments of the disclosure may authorize the users 220-1 and 220-2 to access the authorized zone 250 of the specific area 210 for a certain time period. Specifically, the electronic control device 230 may determine, using the electronic device 240-1 of the user, whether the user 220-1 is outside the specific area 210. According to various embodiments of the disclosure, the electronic control device 230 and the electronic device 240-1 of the user may support Bluetooth communication and ultra-wide band (UWB, hereinafter, "UWB") communication. The electronic control device 230 may determine, using Bluetooth communication, whether the electronic device 240-1 of the user exists. The electronic device 240-1 of the user may also determine, using Bluetooth communication, whether the electronic control device 230 exists.

According to various embodiments of the disclosure, the user 220-1 may request a connection to the electronic control device 230 by using the electronic device 240-1 of the user. When the electronic device 240-1 of the user requests a connection by using Bluetooth communication, the electronic control device 230 may allow the connection only to the authorized electronic device 240-1 of the user. A user (e.g., an owner or an administrator of the specific area 210) capable of controlling the specific area 210 may authorize access of the user 220-1 via the electronic control device 230. If, for example, the user 220-1 informs the administrator in advance that the user is going to visit at a specific time, the administrator may configure the electronic control device 230 to authorize connection to the electronic device 240-1 registered by the user 220-1 only for a specific time, or may transmit a temporary key to the electronic device 240-1 of the user. The temporary key may be valid only within a designated time and/or may be valid only for a certain time period after recognition. For example, the temporary key may include a validity time (e.g., 15 minutes or 2:00 to 2:30), a validity period (e.g., March 3, or from March 5 to March 7), an encryption type, and an authorized zone-associated code (e.g., a code indicating 1 m around the door or a code indicating 3 m around the door) of the temporary key.

The electronic control device 230 according to various embodiments of the disclosure may transmit or receive parameters for UWB communication when connected to the electronic device 240-1 of the user by using Bluetooth communication. The parameters for UWB communication may include at least some of channel information, a preamble duration, a pulse repetition frequency (PRF), a preamble code, or whether the communication is based on security or non-security. When connected to the electronic device 240-1 of the user by using UWB communication, the electronic control device 230 may measure a distance from the electronic device 240-1 of the user, and then may authorize, upon entry within a certain area of an external area of the specific area 210, access of the user 220-1 by opening the door. According to various embodiments of the disclosure, the electronic control device 230 may measure a distance from the electronic device of the user by measuring a time of flight (TOF) by using UWB positioning. The electronic control device 230 may determine whether the user having the electronic device has entered the specific area 210, by using an angle of arrival (AOA) (hereinafter, referred to as "AOA"). When it is determined that the user has entered the specific area 210, the electronic control device 230 may measure both a distance from the user 220-2 and a distance from the electronic device 240-2 of the user. The electronic control device 230 according to various embodiments of the disclosure may use a UWB signal in a radar mode and/or a UWB positioning mode. If the UWB signal is used in the radar mode, the electronic control device 230 may transmit the UWB signal and measure a time of the UWB signal reflected back from the user so as to measure the distance from the user. If the UWB signal is used in the UWB positioning mode, the electronic control device 230 may transmit the UWB signal including transmission and/or reception time information so as to measure the distance from the electronic device of the user.

According to various embodiments of the disclosure, the electronic control device 230 may disconnect the Bluetooth connection from the electronic device 240-2 of the user in order to reduce power consumption.

According to various embodiments of the disclosure, the electronic control device 230 may be able to connect to an unauthorized user through Bluetooth communication, but UWB communication may be connectable only to an authorized user.

The electronic control device 230 according to various embodiments of the disclosure may measure the distance from the electronic device 240-2 of the user by using UWB positioning, and whether the electronic device 240-2 of the user is located within the authorized zone 250 may be determined based on the measured distance. According to various embodiments of the disclosure, as described above, the electronic control device 230 may measure the distance from the user 220-2 by using the UWB signal in the radar mode. As in FIG. 2B, since the user 220-3 may move to the unauthorized zone 260 within the specific area 210, while placing the electronic device 240-2 of the user in the authorized zone 250 within the specific area 210, the distance from the user 220-2 may also be measured. If the user 220-3 moves to the unauthorized zone 260 within the specific area 210, the electronic control device 230 may transmit an alarm to at least one of an administrator, a police station, a security guard, and a security company. When a UWB signal is used in the radar mode rather than in the UWB positioning mode, since the electronic control device 230 needs to transmit and receive a UWB signal at the same time and measure the returning UWB signal, a strong signal may need to be transmitted, and power consumption may be thus large. If the UWB signal is used in the radar mode, the complexity of the signal may also increase compared to a case where the UWB signal is used in the UWB positioning mode. Accordingly, the electronic control device 230 according to various embodiments of the disclosure may schedule a UWB signal and use the same in the radar mode in order to reduce power consumption.

The user 220-2 may go outside from the specific area 210 after completing a corresponding task within a certain time. If the user 220-2 stays in the specific area 210 until a predetermined time elapses, the electronic control device 230 may transmit an alarm to at least one of an administrator, a police station, a security guard, and a security company. In addition, the electronic control device 230 may transmit, to an administrator, an alarm for at least one of whether the electronic device of the user is connected through Bluetooth communication, whether the user has entered the authorized zone 250 within the specific area 210, whether the user has entered the unauthorized zone 260 within the specific area 210, and whether the user has gone outside from the specific area 210.

Figure 3:
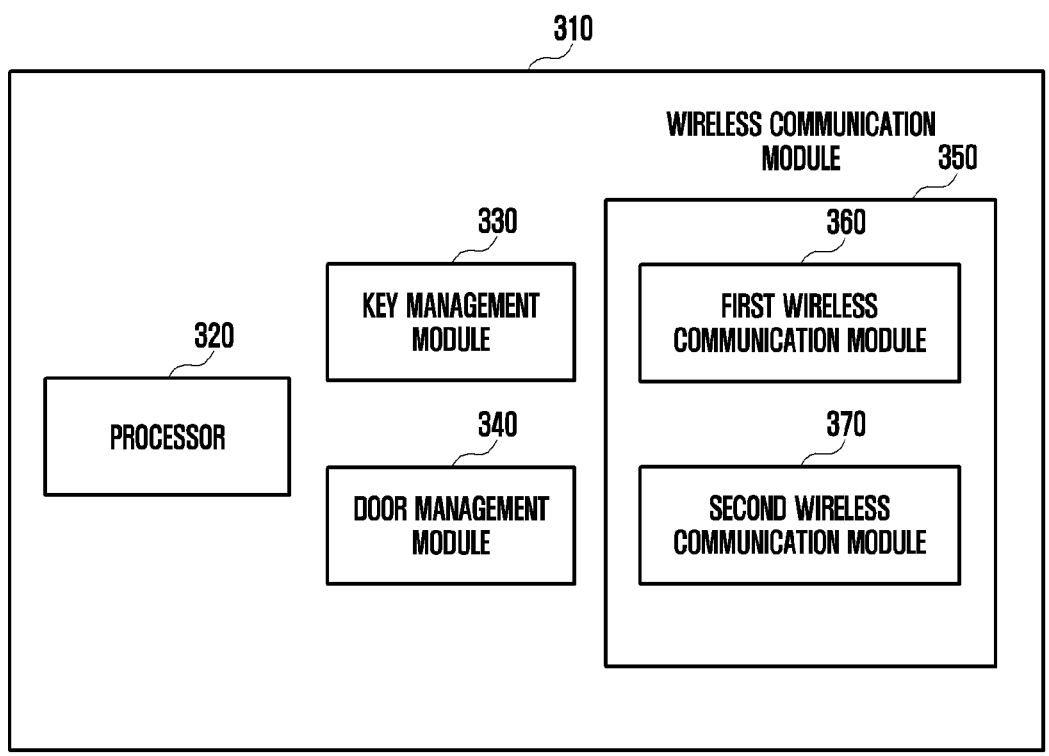
FIG. 3 is a configuration diagram of an electronic control device according to an embodiment of the disclosure.

FIG. 3 is a configuration diagram of an electronic control device according to an embodiment of the disclosure.

Referring to FIG. 3, an electronic control device 310 (e.g., the electronic control device 230 of FIGS. 2A and 2B) according to various embodiments of the disclosure may include a processor 320 (e.g., the processor 120 of FIG. 1), a key management module 330, an door management module 340, and a wireless communication module 350 (e.g., the wireless communication module 192 of FIG. 1). In addition, the electronic control device 310 may further include a microphone (e.g., the sound output module 155 of FIG. 1) and an alarm device.

The wireless communication module 350 according to various embodiments of the disclosure may include a first wireless communication module 360 and a second wireless communication module 370. According to various embodiments of the disclosure, the first wireless communication module 360 may support Bluetooth communication, and the second wireless communication module 370 may support, using UWB communication, a UWB positioning mode and a radar mode.

The first wireless communication module 360 of the electronic control device 310 according to various embodiments of the disclosure may scan, using Bluetooth communication, whether an electronic device of a user, which supports Bluetooth communication, exists within a certain range. The electronic device of the user (e.g., the electronic device 240-1 of the user of FIGS. 2A and 2B) may also perform scanning using Bluetooth communication. If the electronic control device 310 is detected, a user (e.g., the user 220-1 in FIGS. 2A and 2B) may request a connection to the electronic control device 310 by using Bluetooth communication of the electronic device 240-1 of the user. The electronic control device 310 may determine whether the electronic device 240-1 of the user is a device authorized to access the specific area 210. For example, as described above, the electronic control device 310 may identify a temporary key transmitted to the electronic device 240-1 of the user so as to determine whether the electronic device 240-1 of the user is a device authorized to access the specific area. As another example, the electronic control device 310 may identify a permanent key stored in the electronic device 240-1 of the user so as to determine whether the electronic device 240-1 of the user is a device authorized to access the specific area. The permanent key may be an identifier of the electronic device 240-1 of the user, for example, a mac address or an international mobile equipment identity (IMEI). The permanent key and the temporary key may be managed and stored by the key management module 330.

According to various embodiments of the disclosure, if the electronic device 240-1 of the user is determined to be a device authorized to access the specific area 210, the first wireless communication module 360 may establish a connection to the electronic device 240-1 of the user by using Bluetooth communication. The electronic control device 310 may transmit or receive a message for using UWB communication to or from the electronic device 240-1 of the user authorized to access the specific area 210. The message for using UWB communication may include parameters required for UWB communication and may be transmitted or received using Bluetooth communication. When the electronic device 240-1 of the user is connected through UWB communication, the electronic control device 310 may disconnect the connection through Bluetooth communication.

The second wireless communication module 370 of the electronic control device 310 according to various embodiments of the disclosure may perform UWB communication with the electronic device 240-1 by using parameters received using Bluetooth communication. The second wireless communication module 370 may identify a key (e.g., a permanent key or a temporary key) included in the electronic device 240-1 of the user through UWB communication. In this case, the key may be a key previously configured and transmitted by an administrator.

The second wireless communication module 370 according to various embodiments of the disclosure may measure a ToF in the UWB positioning mode by using UWB communication so as to measure the distance to the electronic device 240-1 of the user. The second wireless communication module 370 may determine, by measuring an AOA, whether the electronic device 240-1 of the user is the authorized zone within the specific area 210, in the unauthorized zone within the specific area 210, or outside the specific area 210.

The second wireless communication module 370 according to various embodiments of the disclosure may also use a UWB signal in the radar mode. The second wireless communication module 370 may use a UWB signal to measure a distance from the user. The second wireless communication module 370 may obtain the distance to the user, altitude, direction, or speed information by transmitting a UWB signal and analyzing the reflected signal.

The key management module 330 of the electronic control device 310 according to various embodiments of the disclosure may manage a key given to at least one electronic device of a user. A key type may include a permanent key that allows access to the specific area 210 at any time and a temporary key that allows access to the specific area 210 only for a certain time period. If an electronic device of a user is owned by an administrator, the electronic device of the user may have a permanent key. For example, the permanent key may be at least one of a mac address of the electronic device of the user and a unique identifier of the electronic device, such as an IMEI. The administrator of the specific area 210 and electronic devices of group members designated by the administrator may own the permanent key.

On the other hand, in the aforementioned case of users designated by the administrator, a temporary key may be assigned. In various embodiments of the disclosure, a key will be described by division into a permanent key and a temporary key, but characteristics of the key may be further subdivided according to a zone within the specific area 210, to which access is authorized, and/or an access time during which access is authorized. For example, a temporary key may be further subdivided into a first temporary key that allows an access time of up to 10 minutes, a second temporary key that allows access only to 1 m from the door within the specific area 210, a third temporary key that allows an access time of up to 2 minutes and allows access to 5 m from the door within the specific area 210, and the like.

A door management module 340 of the electronic control device 310 according to various embodiments of the disclosure may control a door locking device. According to a key stored the electronic device 240-1 of the user, the door management module 340 of the electronic control device 310 may deactivate the door locking device and may activate the door locking device when the electronic device 240-1 of the user is out of the specific area 210.

The electronic control device 310 according to various embodiments of the disclosure may optionally further include a speaker 155 so as to notify a user of a time during which the user is allowed to stay in the specific area 210 or warn that the user has entered an unauthorized zone (e.g., the unauthorized zone of FIGS. 2A and 2B). Alternatively, the electronic control device 310 may transmit such information to the electronic device 240-2 of the user by using UWB communication.

Figure 4:
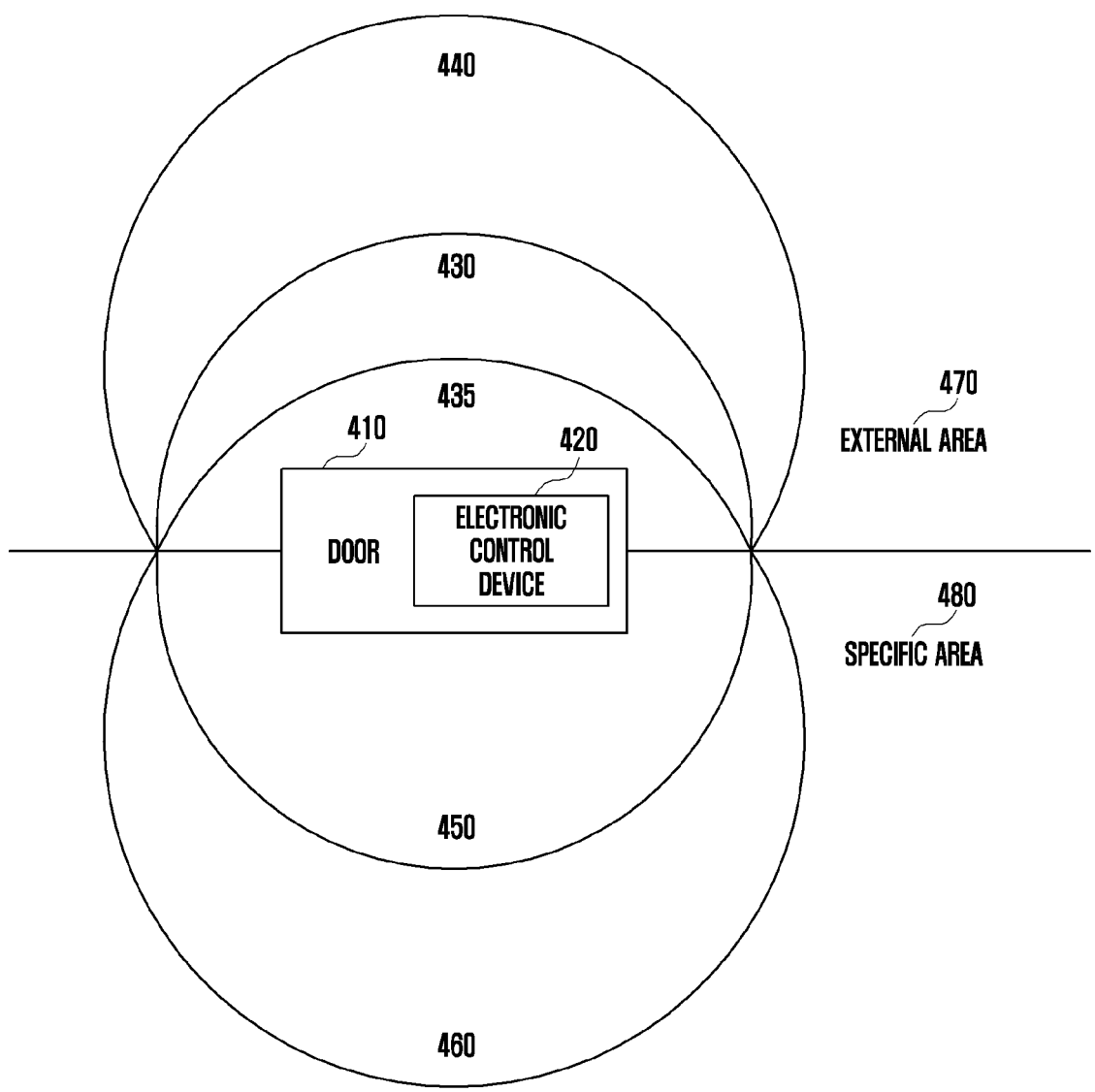
FIG. 4 is a diagram illustrating areas according to an embodiment of the disclosure.

FIG. 4 is a diagram illustrating areas according to an embodiment of the disclosure.

Referring to FIG. 4, the areas according to the various embodiments of the disclosure may be largely divided into a specific area 480 (e.g., the specific area 210 of FIG. 2) and an external area 470 of the specific area 480. According to various embodiments of the disclosure, the specific area 480 and the external area 470 are areas distinguishable by an electronic control device 420 (e.g., the electronic control device 230 of FIGS. 2A and 2B), and may be inside and outside a door 410.

The external area 470 may be divided into a first area 440 in which first communication with the electronic control device 420 is possible and a second area 430 in which second communication with the electronic control device 420 is possible according to various embodiments of the disclosure. According to various embodiments of the disclosure, the first communication may be Bluetooth communication, and the second communication may be UWB communication. The second area 430 may include a third area 435 in which the electronic control device 420 deactivates a locking device of the door 410. For example, the electronic control device 420 may deactivate the locking device of the door 410 when an authorized electronic device of a user (e.g., the electronic device 240-1 of the user of FIGS. 2A and 2B) enters the third area 435.

When the electronic device 240-1 of the user enters the first area 440, the electronic control device 420 may establish a connection to the electronic device 240-1 of the user through the first communication. The electronic control device 420 may transmit or receive parameters required for the second communication to or from the electronic device 240-1 of the user by using the first communication. The electronic control device 420 may establish a connection to the electronic device 240-1 of the user by using the second communication, and the electronic control device 420 may measure a distance from the electronic device 240-1 of the user. If it is determined, based on the measured distance from the electronic device 240-1 of the user, that the electronic device 240-1 of the user is located in the third area 435, the electronic control device 420 may deactivate the locking device of the door 410. The third area 435 may be configured by an administrator capable of controlling the specific area 480. The third area 435 may be configured in consideration of a distance from a neighboring house, a size of a door, an installation location of the electronic control device 420, and the like. For example, if the distance from the electronic device 240-1 of the user is less than a preconfigured distance, the electronic control device 420 may determine that the electronic device 240-1 of the user is located in the third area 435. The preconfigured distance may be configured by the administrator.

The specific area 480 may be divided into an authorized zone 450 (e.g., the authorized zone 250 of FIGS. 2A and 2B) and an unauthorized zone 460 (e.g., the unauthorized zone 260 of FIGS. 2A and 2B). Both the authorized zone 450 and the unauthorized zone 460 may be configured, like the third area 435, by the administrator. In FIG. 4, the specific area 480 has been divided into two zones, but this is merely an example, and the area may be further subdivided. For example, the authorized zone may be narrower from the door compared to a certain distance, and may be wider from the door compared to the certain distance. As described above, the authorized zone 450 may be distinguished by a key type that may be assigned to the electronic device of the user. The electronic control device 420 according to various embodiments of the disclosure may use the UWB positioning mode and/or the radar mode to measure a distance from a user (e.g., the user 220-2 or 220-3 of FIGS. 2A and 2B) and/or from an electronic device of the user (e.g., the electronic device 240-2 of the user of FIGS. 2A and 2B) located in the specific area 480.

Hereinafter, an operation method of an electronic control device according to a key stored in an electronic device of a user may be described.

Figure 5:
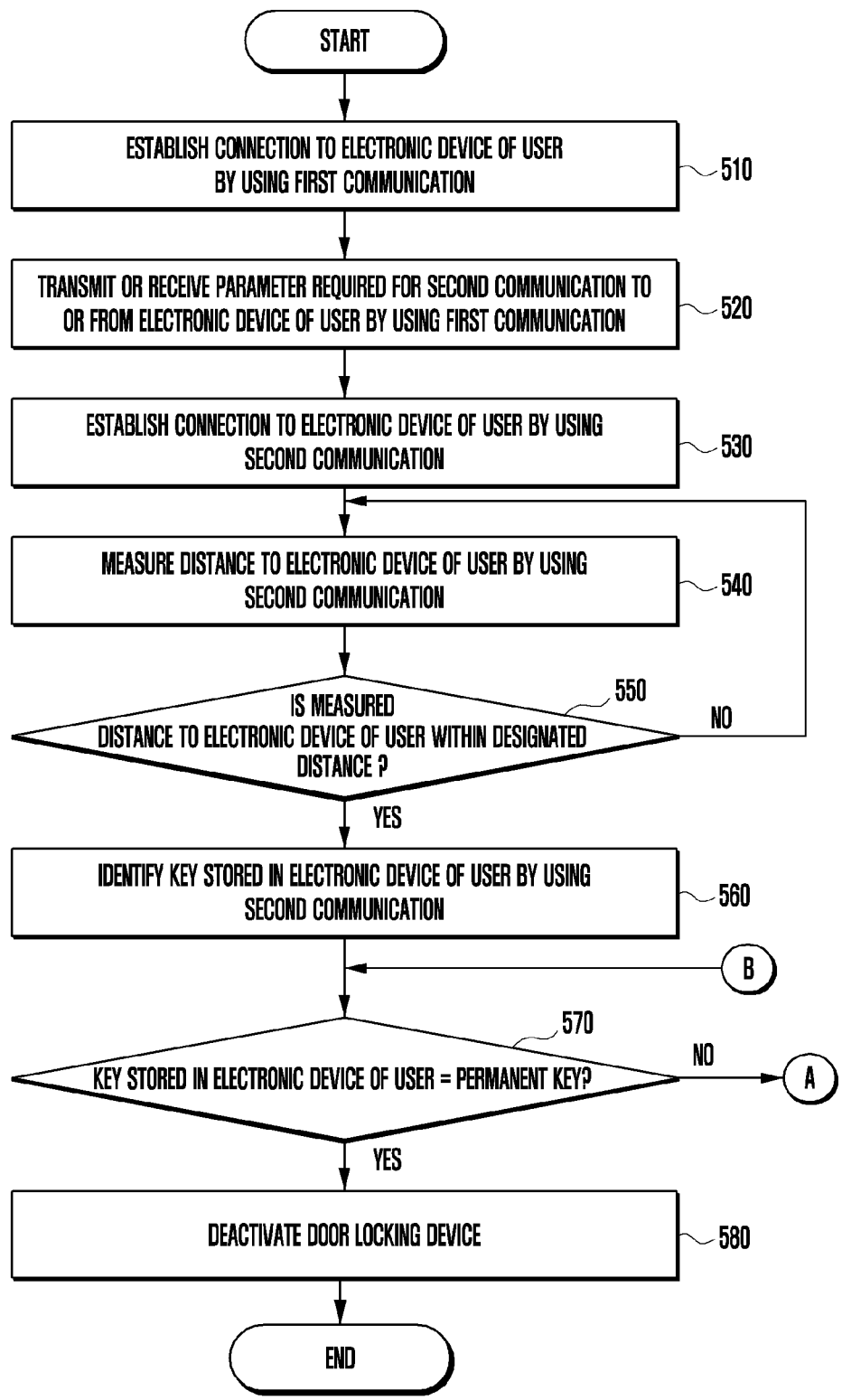
FIG. 5 is a flowchart of an electronic control device when an electronic device of a user has a permanent key, according to an embodiment of the disclosure.

FIG. 5 is a flowchart of an electronic control device when an electronic device of a user has a permanent key, according to an embodiment of the disclosure.

Referring to FIG. 5, in operation 510, an electronic control device (e.g., the electronic control device 420 of FIG. 4) may establish a connection to an electronic device of a user (e.g., the electronic device 240-1 of the user of FIGS. 2A and 2B) by using first communication. According to various embodiments of the disclosure, the first communication may be Bluetooth communication, and the electronic device 240-1 of the user may request a connection from the electronic control device 420. For example, the user (e.g., the user 220-1 of FIGS. 2A and 2B) may request a connection from the electronic control device 420 by using the electronic device 240-1 of the user.

In operation 520, the electronic control device 420 may transmit or receive parameters required for second communication to or from the electronic device 240-1 of the user by using the first communication. According to various embodiments of the disclosure, the second communication may be UWB communication, and parameters required for the UWB communication may include a channel, a preamble duration, a pulse repetition frequency, a preamble code, and whether the communication is secure or non-secure. According to various embodiments of the disclosure, the electronic control device 420 may identify, using the first communication, whether the electronic device 240-1 of the user is an access authorized device, and may transmit or receive parameters required for the second communication to or from the electronic device 240-1 of the user.

In operation 530, the electronic control device 420 may establish a connection to the electronic device 240-1 of the user by using the second communication. According to various embodiments of the disclosure, the electronic control device 420 and the electronic device 240-1 of the user may perform synchronization for UWB positioning. According to various embodiments of the disclosure, the electronic control device 420 may identify, using the second communication, whether the electronic device 240-1 of the user is an access authorized device.

In operation 540, the electronic control device 420 may measure a distance to the electronic device 240-1 of the user by using the second communication. According to various embodiments of the disclosure, the electronic control device 420 may measure the distance to the electronic device 240-1 of the user by measuring a ToF. For example, the electronic control device 420 may calculate the distance to the electronic device 240-1 of the user by using the measured ToF. The second communication may also include a security code so as to maintain security. For example, the second communication may include a scrambled time stamp (STS) so as to maintain security between the electronic control device 420 and the electronic device 240-1 of the user.

In operation 550, the electronic control device 420 may determine whether the measured distance to the electronic device 240-1 of the user is within a designated distance.

In operation 560, if the measured distance to the electronic device 240-1 of the user is within the designated distance, the electronic control device 420 may identify a key stored in the electronic device 240-1 of the user by using the second communication. The designated distance may be a distance outside a door, and may be arbitrarily configured by an administrator. According to various embodiments of the disclosure, if the measured distance to the electronic device 240-1 of the user is greater than the designated distance, the electronic control device 420 may perform operation 540 again.

In operation 570, the electronic control device 420 may determine, using the second communication, whether the key stored in the electronic device 240-1 of the user is a permanent key.

In operation 580, if the electronic device 240-1 of the user is identified to have a permanent key, the electronic control device 420 may deactivate a door locking device. According to various embodiments of the disclosure, the electronic control device 420 may identify whether the electronic device 240-1 of the user has the permanent key, by identifying a key ID included in a data frame transmitted or received through the second communication. For example, the key ID of the permanent key may be 0. According to various embodiments of the disclosure, the electronic control device 420 may disconnect the connection to the electronic device 240-1 of the user and deactivate the door locking device for a certain time period. Alternatively, when the electronic device 240-1 of the user enters a specific area (e.g., 210 of FIGS. 2A and 2B), the electronic control device 420 may disconnect the connection to the electronic device 240-1 of the user. The electronic control device 420 may disconnect the connection to the electronic device 240-1 of the user to reduce power consumption.

Figure 6:
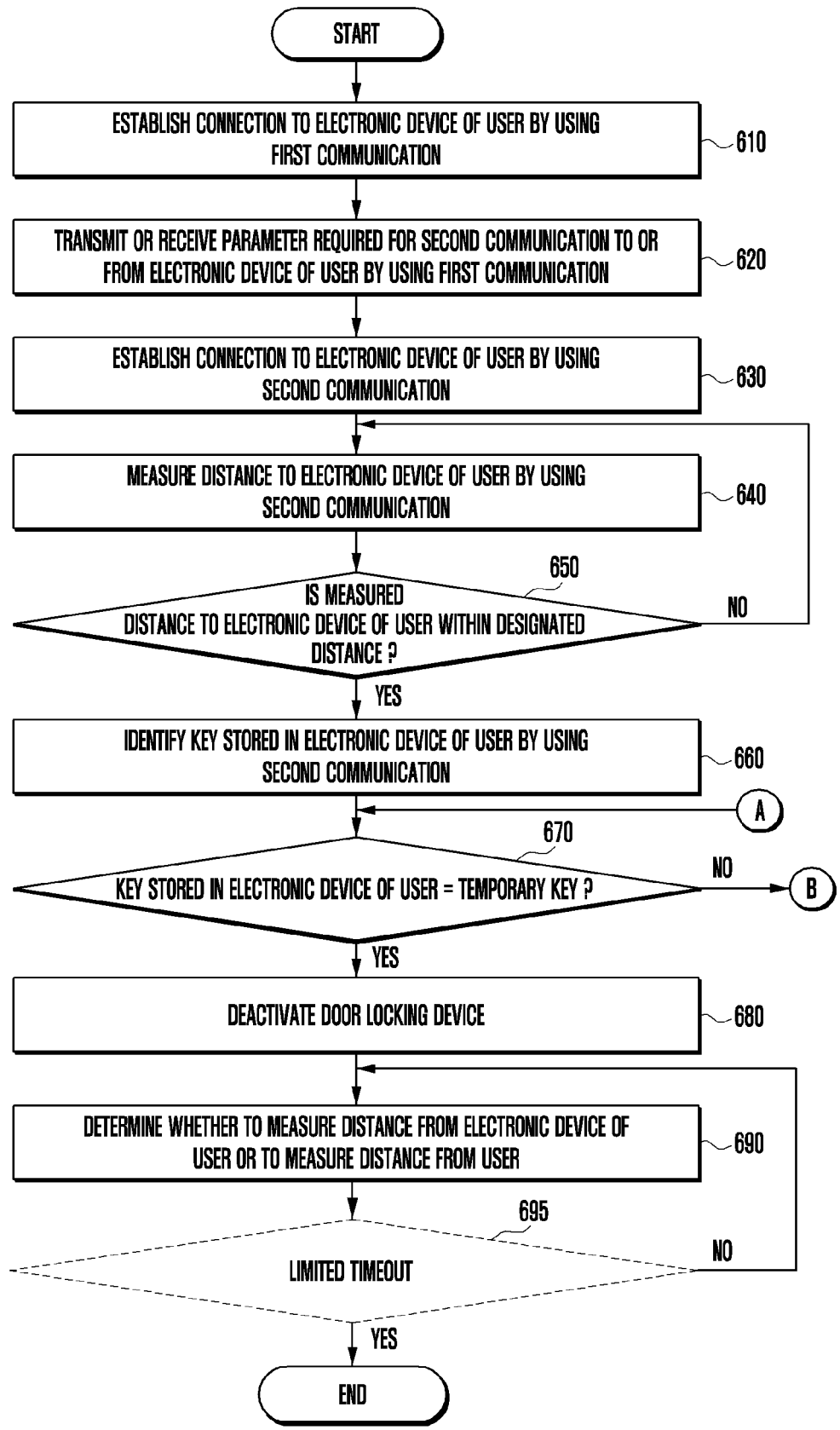
FIG. 6 is a flowchart of an electronic control device when an electronic device of a user has a temporary key, according to an embodiment of the disclosure.

If the electronic device 240-1 of the user is identified not to have a permanent key, the electronic control device 420 may identify whether the electronic device 240-1 of the user has a temporary key, as in operation 670 in FIG. 6. Subsequent operations of the electronic control device 420 will be described in detail with reference to FIG. 6.

It has been described in FIG. 5 that the electronic control device 420 identifies a key of an electronic device of a user by using second communication, but the disclosure is not limited thereto. For example, the electronic control device 420 may identify a key of an electronic device of a user by using first communication.

FIG. 6 is a flowchart of an electronic control device when an electronic device of a user has a temporary key, according to an embodiment of the disclosure.

Referring to FIG. 6, in operations 610 to 670, an electronic control device (e.g., the electronic control device 420 of FIG. 4) may operate in the same manner as when an electronic device of a user (e.g., the electronic device 240-1 of FIGS. 2A and 2B) has a permanent key. According to various embodiments of the disclosure, the electronic control device 420 may operate in the same manner regardless of a key type until a key stored in the electronic device 240-1 of the user is identified.

In operation 610, an electronic control device (e.g., the electronic control device 420 of FIG. 4) may establish a connection to an electronic device of a user (e.g., the electronic device 240-1 of the user of FIGS. 2A and 2B) by using first communication. According to various embodiments of the disclosure, the first communication may be Bluetooth communication, and the electronic device 240-1 of the user may request a connection from the electronic control device 420. For example, the user (e.g., the user 220-1 of FIGS. 2A and 2B) may request a connection from the electronic control device 420 by using the electronic device 240-1 of the user.

In operation 620, the electronic control device 420 may transmit or receive parameters required for second communication to or from the electronic device 240-1 of the user by using the first communication. According to various embodiments of the disclosure, the second communication may be UWB communication, and parameters required for the UWB communication may include a channel, a preamble duration, a pulse repetition frequency, a preamble code, whether the communication is secure or non-secure, and the like. According to various embodiments of the disclosure, the electronic control device 420 may identify, using the first communication, whether the electronic device 240-1 of the user is an access authorized device, and may transmit or receive parameters required for the second communication to or from the electronic device 240-1 of the user.

In operation 630, the electronic control device 420 may establish a connection to the electronic device 240-1 of the user by using the second communication. According to various embodiments of the disclosure, the electronic control device 420 and the electronic device 240-1 of the user may perform synchronization for UWB positioning. According to various embodiments of the disclosure, the electronic control device 420 may identify, using the second communication, whether the electronic device 240-1 of the user is an access authorized device.

In operation 640, the electronic control device 420 may measure a distance to the electronic device 240-1 of the user by using the second communication. According to various embodiments of the disclosure, the electronic control device 420 may measure the distance to the electronic device 240-1 of the user by measuring a ToF. For example, the electronic control device 420 may calculate the distance to the electronic device 240-1 of the user by using the measured ToF. The second communication may also include a security code so as to maintain security. For example, the second communication may include a scrambled time stamp (STS) so as to maintain security between the electronic control device 420 and the electronic device 240-1 of the user.

In operation 650, the electronic control device 420 may determine whether the measured distance to the electronic device 240-1 of the user is within a designated distance.

In operation 660, if the measured distance to the electronic device 240-1 of the user is within the designated distance, the electronic control device 420 may identify a key stored in the electronic device 240-1 of the user by using the second communication. The designated distance may be a distance outside a door, and may be arbitrarily configured by an administrator. According to various embodiments of the disclosure, if the measured distance to the electronic device 240-1 of the user is greater than the designated distance, the electronic control device 420 may perform operation 540 again.

In operation 670, the electronic control device 420 may determine, using the second communication, whether the key stored in the electronic device 240-1 of the user is a temporary key.

In operation 680, if the electronic device 240-1 of the user is identified to have a temporary key, the electronic control device 420 may deactivate a door locking device. According to various embodiments of the disclosure, the electronic control device 420 may activate a timer when the door locking device is deactivated. The timer may be configured differently according to a type of the temporary key. According to various embodiments of the disclosure, the timer may be individually configured by an administrator capable of controlling a specific area (e.g., 480 in FIG. 4).

In operation 690, the electronic control device 420 may determine whether to measure the distance from the electronic device of the user or whether to measure the distance from the user. According to various embodiments of the disclosure, the electronic control device 420 may measure an AOA with respect to the electronic device 240-1 of the user in the UWB positioning mode. The electronic control device 420 may determine, based on the measured AOA, whether the electronic device 240-1 of the user is located inside the door, that is, within the specific area (e.g., 210 in FIGS. 2A and 2B) or is located outside the door. According to various embodiments of the disclosure, even when a permanent key is stored in the electronic device 240-1 of the user, the electronic control device 420 may determine, by measuring the AOA, whether the user is located inside or outside the door.

According to various embodiments of the disclosure, if the electronic device 240-2 of the user is determined to be located within the specific area 210, the electronic control device 420 may measure the distance from the user 220-2 by using a UWB signal in the radar mode and may also measure the distance from the electronic device 240-2 of the user by using the UWB signal in the UWB positioning mode. According to various embodiments of the disclosure, the electronic control device 420 may alternately measure the distance from the user and the distance from the electronic device 240-2 of the user for a certain time period. If the UWB signal is used in the radar mode, the electronic control device 420 may have to increase a signal intensity, and thus power consumption may be large. If the UWB signal is used in the radar mode, transmission and reception should be performed together, and the complexity of a transmitted signal may increase, and thus power consumption may be large.

According to various embodiments of the disclosure, the electronic control device 420 may determine whether to measure the distance from the electronic device 240-2 of the user or to measure the distance from the user 220-2, by comparing at least one of the measured distance from the electronic device 240-2 of the user, the measured distance from the user 220-2, and a measurement value of a sensor transmitted from the electronic device 240-2. The electronic device 240-2 of the user according to various embodiments of the disclosure may include a sensor, for example, a 6-axis sensor. A method of determining whether to use a UWB signal to measure the distance from the electronic device 240-2 of the user or to use the UWB signal to measure the distance from the user may be described in detail below with reference to FIG. 7. According to various embodiments of the disclosure, the electronic control device 420 may determine a distance between a user and an electronic device of the user by using a distance from the user and a distance from the electronic device of the user. If it is determined that the distance between the user and the electronic device of the user is increasing, the electronic control device 420 may measure the distance from the user more frequently.

According to various embodiments of the disclosure, the electronic control device 420 may use the measured distance from the user (e.g., 220-3 of FIGS. 2A and 2B) to warn the user 220-2 if the user 220-3 is located in an unauthorized zone or the timer is running out of time. The electronic control device 420 may use the measured distance from the electronic device 240-2 of the user to warn also when the electronic device 240-2 of the user is located in the unauthorized zone. The electronic control device 420 may warn also when the measured distance from the user 220-3 or the measured distance from the electronic device 240-2 of the user is greater than a predetermined value (e.g., $E_{dmax}$ or $E_{max}$). For example, the electronic control device 420 may determine whether to warn the user 220-3, by using Equation 1.

$$a_{m-1} \geq E_{dmax}$$
$$C_{m-1} \geq E_{max}$$ Equation 1

Here, m−1 may indicate a time point immediately before determining whether to provide a warning, $a_{m-1}$ may indicate a distance from a user, which is measured in the radar mode at the time point of m−1, $c_{m-1}$ may indicate a distance from an electronic device of the user, which is measured in the UWB positioning mode at the time point of m−1, and $E_{dmax}$ and $E_{max}$ may be warning determination criteria preconfigured in terms of the distance from the user and the distance from the electronic device of the user.

According to various embodiments of the disclosure, the electronic control device 420 may compare the measured distance from the user 220-2 with the measured distance from the electronic device 240-2 of the user so as to provide a warning also when a comparison result is greater than a certain distance. For example, the electronic control device 420 may determine whether to warn the user 220-3, by using Equation 2.

$$|C_{m-1} - a_{m-1}| \geq E_{thr}$$ Equation 2

Here, m−1 may indicate a time point immediately before determining whether to provide a warning, $a_{m-1}$ may indicate a distance from a user, which is measured in the radar mode at the time point of m−1, $c_{m-1}$ may indicate a distance from an electronic device of the user, which is measured in the UWB positioning mode at the time point of m−1, and $E_{thr}$ may be a preconfigured determination criterion of whether to provide a warning.

The electronic control device 420 may provide a warning to the user 220-2 by using a speaker or may transmit a warning message to the electronic device 240-2 of the user. The electronic device 240-2 of the user may warn the user 220-3 by using a speaker, vibration, or the like.

When the user 220-2 enters the specific area 210, the timer expires, or the user 220-2 enters the outside from the specific area 210, the temporary key stored in the electronic device 240-2 of the user may be discarded or deactivated.

In operation 695, the electronic control device 420 may determine whether a limited time for the electronic device 240-1 of the user has elapsed. If it is determined that the limited time for the electronic device 240-1 of the user has elapsed, the electronic control device 420 may perform termination after a certain time after warning the user.

According to various embodiments of the disclosure, the electronic control device 420 may activate the door locking device when the user and the electronic device of the user are out of an authorized zone.

In FIG. 5 and FIG. 6, it has been described that the electronic control device 420 identifies the key stored in the electronic device of the user by using the second communication, but the key stored in the electronic device of the user may also be identified using the first communication. For example, the electronic control device 420 may identify the key of the electronic device of the user after being connected to the electronic device of the user by using the first communication.

Hereinafter, a method by which an electronic control device schedules, using a UWB signal, whether to measure a distance from an electronic device of a user or to measure a distance from the user may be described in detail. For reference, timing at which the electronic control device schedules a UWB signal may be one of a case where a user enters a specific area, a case where the user is near the electronic control device, or a case where a door locking device is deactivated by the electronic control device.

Figure 7:
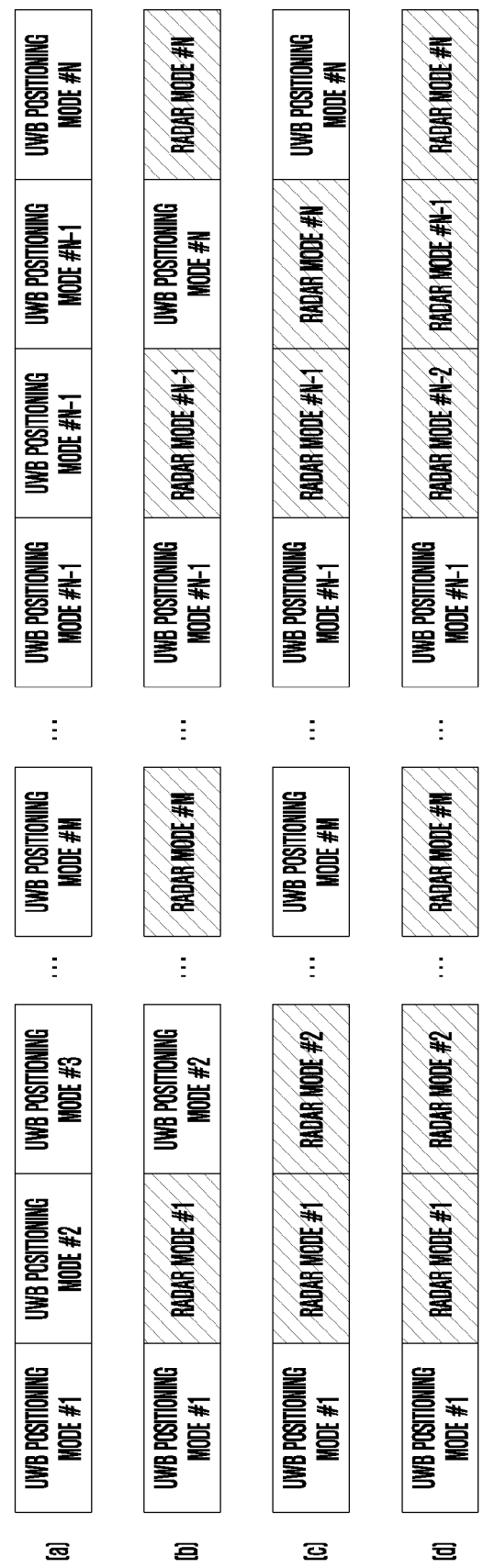
FIG. 7 illustrates an example of scheduling by an electronic control device according to an embodiment of the disclosure.

FIG. 7 illustrates an example of scheduling a UWB signal by an electronic control device according to an embodiment of the disclosure.

A UWB signal may be used in the UWB positioning mode or used to measure a distance in the radar mode. FIG. 7 shows a mode in which a UWB signal is used. If a UWB signal is used in the UWB positioning mode, the UWB signal may be transmitted with a guard time as a single pulse having a width of 2 ns. On the other hand, if a UWB signal is used in the radar mode, the UWB signal may be continuously transmitted without a guard time with a pulse having a width of 2 ns for a resolution of 10 cm.

Part (a) of FIG. 7 may be an example in which an electronic control device (e.g., the electronic control device 230 of FIGS. 2A and 2B) measures only a distance from an electronic device of a user by using UWB positioning according to various embodiments of the disclosure. According to various embodiments of the disclosure, if the electronic device of the user (e.g., the electronic device 240-1 of the user of FIGS. 2A and 2B) is located outside (e.g., 430 of FIG. 4) or a door locking device is activated, the electronic control device 230 may measure the distance from the electronic device 240-1 of the user by using the UWB positioning mode.

Part (b) of FIG. 7 may be an example in which the electronic control device 230 alternately measures the distance from the electronic device of the user and the distance from the user according to various embodiments of the disclosure. According to various embodiments of the disclosure, when the electronic device 240-1 of the user enters a specific area or the door locking device is deactivated, the electronic control device 230 may alternately measure the distance from the electronic device of the user and the distance from the user.

Part (b) to part (d) of FIG. 7 may illustrate examples in which the electronic control device 230 measures the distance from the user more frequently than the distance from the electronic device of the user according to various embodiments of the disclosure. For example, if the user moves while leaving the electronic device of the user, the electronic control device 230 may measure the distance from the user while scheduling from part (a) to part (d) of FIG. 7.

The electronic control device 230 may consider, during scheduling, at least one of the distance from the electronic device of the user, the distance from the user, and a measurement value of a sensor included in the electronic device. According to various embodiments of the disclosure, a measurement value of a 6-axis sensor (a 3-axis acceleration sensor and a 3-axis gyroscope) may be used, and a measurement value of an acceleration sensor, etc. may be additionally used. The electronic device of the user may transmit a payload including the sensor measurement value during UWB communication with the electronic control device 230.

According to various embodiments of the disclosure, the electronic control device 230 may use the following methods to determine whether to use the UWB signal to measure the distance from the electronic device of the user or whether to use the UWB signal to measure the distance from the user.

The electronic control device 230 may use at least one of a key (e.g., a temporary key or a permanent key), a distance from the user, which is measured using a radar, a measurement value of a sensor included in the electronic device of the user, and a distance from the electronic device of the user by UWB positioning.

The key is a key assigned to the electronic device of the user and may be divided into a permanent key or a temporary key, wherein the temporary key may be further subdivided. For example, a value of the key may be configured to 0 for the permanent key and 1 for the temporary key. According to various embodiments of the disclosure, the electronic control device 230 may not perform scheduling if the key assigned to the electronic device of the user is a permanent key, and may perform scheduling only in the case of a temporary key.

Equation 3 may be used to determine whether to consider the distance from the user during scheduling.

$$\Delta d_m = \left| a_{m-1} - \frac{1}{m-2} \sum_{k=l}^{m-2} a_k \right| = \begin{pmatrix} 1, & \Delta d_m \geq d_{thr} \\ 0, & \Delta d_m < d_{thr} \end{pmatrix} \quad \text{Equation 3}$$

Here, m may indicate a scheduling time point, a may indicate a distance from a user, which is measured using a radar, k may indicate a time point to be considered, and $\Delta d_m$ may indicate a value to be used for scheduling. $d_{thr}$ may indicate, in terms of the distance from the user measured in the radar mode, a threshold value based on which the user may be determined to be away from the electronic device of the user by a designated distance or greater. $d_{thr}$ may be changed. For example, if $\Delta d_m$ is 1, the electronic control device 230 may consider the distance from the user during scheduling, and may not consider the same otherwise.

Equation 4 may be used to determine whether to consider the measurement value of the sensor during scheduling.

$$\Delta s_m = \left| b_{m-1} - \frac{1}{m-2} \sum_{k=l}^{m-2} b_k \right| = \begin{pmatrix} 1, & \Delta s_m \geq d_{thr} \\ 0, & \Delta s_m < s_{thr} \end{pmatrix} \quad \text{Equation 4}$$

Here, m may indicate a scheduling time point, b may indicate a measurement value of a sensor, k may indicate a time point to be considered, and $\Delta s_m$ may indicate a value to be used for scheduling. $s_{thr}$ may indicate, in terms of the measurement value of the sensor included in the electronic device of the user, a threshold value based on which the user may be determined to be away from the electronic device of the user by a designated distance or greater. $s_{thr}$ may be changed. Similarly, if $\Delta s_m$ is 1, the electronic control device 230 may consider the sensor value measured during scheduling, and may not consider the same otherwise.

Equation 5 may be used to determine whether to consider the distance from the electronic device of the user during scheduling.

$$\Delta r_m = \left| c_{m-1} - \frac{1}{m-2} \sum_{k=l}^{m-2} c_k \right| = \begin{pmatrix} 1, & \Delta r_m \geq r_{thr} \\ 0, & \Delta r_m < r_{thr} \end{pmatrix} \quad \text{Equation 5}$$

Here, m may indicate a scheduling time point, c may indicate a distance from an electronic device of a user, which is measured using UWB communication, k may indicate a time point to be considered, and $\Delta r_m$ may indicate a value to be used for scheduling. $r_{thr}$ may indicate, in terms of the distance from the electronic device of the user, which is measured using the UWB positioning mode, a threshold value based on which the user may be determined to be away from the electronic device of the user by a designated distance or greater. $r_{thr}$ may be changed. That is, if $\Delta r_m$ is 1, the electronic control device 230 may consider the distance from the electronic device of the user during scheduling, and may not consider the same otherwise.

According to various embodiments of the disclosure, the electronic control device 230 may determine whether to measure the distance from the electronic device of the user or to measure the distance from the user by using the sum of the previously obtained values ($\Delta d_m$, $\Delta s_m$, and $\Delta r_m$).

An electronic device according to various embodiments of the disclosure may include a communication module configured to perform first communication and second communication, an access management module configured to control a door locking device, and a processor operatively connected to the communication module and the access management module, wherein the processor is configured to establish a connection to an external electronic device by using the first communication, transmit or receive a parameter for the second communication by using the first communication, establish a connection to the external electronic device by using the second communication, measure a distance from the external electronic device by using a first mode of the second communication, identify a key stored in the external electronic device if the measured distance is within a designated distance, activate or deactivate, based on the key, the door locking device by using the access management module, and determine, when the door locking device is deactivated, whether a first distance from a user of the external electronic device or a second distance from the external device is measured, based on at least one of a state of the external electronic device, the first distance, or the second distance, and the first distance is measured using a second mode of the second communication.

In the electronic device according to various embodiments of the disclosure, the first communication may be Bluetooth communication, and the second communication may be ultra-wide band (UWB) communication.

According to various embodiments of the disclosure, the parameter required for the second communication may include a channel, a preamble duration, a pulse repetition frequency, a preamble code, and whether the communication is secure or non-secure.

In the electronic device according to various embodiments of the disclosure, the first mode may be a UWB positioning mode, and the second mode may be a radar mode.

The processor of the electronic device according to various embodiments of the disclosure may determine, by measuring an angle of arrival (AOA), whether the user of the external electronic device has entered an authorized zone.

In the electronic device according to various embodiments of the disclosure, the state of the external electronic device may be determined using a sensor included in the external electronic device.

In the electronic device according to various embodiments of the disclosure, the key may be configured differently according to at least one of a time during which access to an authorized zone is authorized and a range of the authorized zone.

The electronic device according to various embodiments of the disclosure may further include a speaker, wherein the processor is configured to, when the door locking device is deactivated, configure a timer, and provide a warning by using the speaker if it is determined that the measured distance from the user of the external electronic device or the measured distance from the external electronic device is greater than a determined value or the configured timer expires.

The processor of the electronic device according to various embodiments of the disclosure may disconnect the connection with the first communication if a connection is established to the external electronic device by using the second communication.

In the electronic device according to various embodiments of the disclosure, at least one of a specific area and an authorized zone may be configured by an administrator of the electronic device.

An operation method of an electronic device according to various embodiments of the disclosure may include establishing a connection to an external electronic device by using first communication, transmitting or receiving a parameter for second communication by using the first communication, establishing a connection to the external electronic device by using the second communication, measuring a distance from the external electronic device by using a first mode of the second communication, identifying a key stored in the external electronic device if the measured distance is within a designated distance, activating or deactivating, based on the key, a door locking device, and determining, when the door locking device is deactivated, whether a first distance from a user of the external electronic device or a second distance from the external device is measured, based on at least one of a state of the external electronic device, the first distance, or the second distance, wherein the first distance is measured using a second mode of the second communication.

In the operation method of the electronic device according to various embodiments of the disclosure, the first communication may be Bluetooth communication, and the second communication may be ultra-wide band (UWB) communication.

In the operation method of the electronic device according to various embodiments of the disclosure, the parameter required for the second communication may include a channel, a preamble duration, a pulse repetition frequency, a preamble code, and whether the communication is secure or non-secure.

In the operation method of the electronic device according to various embodiments of the disclosure, the first mode may be a UWB positioning mode, and the second mode may be a radar mode.

In the operation method of the electronic device according to various embodiments of the disclosure, whether the user of the external electronic device has entered an authorized zone may be determined by measuring an angle of arrival (AOA).

In the operation method of the electronic device according to various embodiments of the disclosure, the state of the external electronic device may be determined using a sensor included in the external electronic device.

In the operation method of the electronic device according to various embodiments of the disclosure, the key may be configured differently according to at least one of a time during which access to an authorized zone is authorized and a range of the authorized zone.

The operation method of the electronic device according to various embodiments of the disclosure may further include configuring a timer when the door locking device is deactivated, and providing a warning if it is determined that the measured distance from the user of the external electronic device or the measured distance from the external electronic device is greater than a determined value or the configured timer expires.

In the operation method of the electronic device according to various embodiments of the disclosure, the connection with the first communication may be disconnected if a connection is established to the external electronic device by using the second communication.

In the operation method of the electronic device according to various embodiments of the disclosure, at least one of a specific area and an authorized zone may be configured by an administrator of the electronic device.

Various other embodiments are also possible.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a communication circuit configured to perform a first communication and a second communication;
an access management circuit configured to control a door locking device; and
a processor operatively connected to the communication circuit and the access management circuit,
wherein the processor is configured to:
establish a connection to an external electronic device by using the first communication,
transmit or receive a parameter for the second communication by using the first communication,
establish a connection to the external electronic device by using the second communication,
measure a distance from the external electronic device by using a first mode of the second communication, wherein the first mode is a positioning mode in which the electronic device transmits a signal including transmission and/or reception time information so as to measure a distance from the external electronic device,
identify a key stored in the external electronic device in case that the measured distance is within a designated distance,
activate or deactivate, based on the key, the door locking device by using the access management circuit,
when the door locking device is deactivated, measure a distance and direction from a user of the electronic device using a second mode of the second communication,
when the door locking device is deactivated, configure a timer, and
provide a warning by using a speaker in case that it is determined that the distance from the user of the electronic device or the distance from the external electronic device is greater than a determined value or the configured timer expires, and
wherein the second mode is a radar mode in which the electronic device transmits a signal and measures a time of the signal reflected back from the user so as to measure the distance and direction from the user.

2. The electronic device of claim 1,
wherein the first communication is Bluetooth communication, and
wherein the second communication is ultra-wide band (UWB) communication.

3. The electronic device of claim 2, wherein the parameter required for the second communication comprises:
a channel,
a preamble duration,
a pulse repetition frequency,
a preamble code, and
whether the communication is secure or non-secure.

4. The electronic device of claim 2, wherein the first mode is a UWB positioning mode, and the second mode is a radar mode.

5. The electronic device of claim 1, wherein the processor is further configured to determine, by measuring an angle of arrival (AOA), whether the user of the external electronic device has entered an authorized zone.

6. The electronic device of claim 1, wherein a state of the external electronic device is determined using a sensor included in the external electronic device.

7. The electronic device of claim 1, wherein the key is configured differently according to at least one of a time during which access to an authorized zone is authorized and a range of the authorized zone.

8. The electronic device of claim 1, wherein the processor is further configured to disconnect the connection with the first communication in case that a connection is established to the external electronic device by using the second communication.

9. The electronic device of claim 1, wherein at least one of a specific area and an authorized zone is configured by an administrator of the electronic device.

* * * * *